(12) United States Patent
Lumpkin

(10) Patent No.: US 6,244,396 B1
(45) Date of Patent: Jun. 12, 2001

(54) BRAKE BLOCK FOR A BICYCLE HAVING REPLACEABLE BRAKE PAD SEGMENTS

(75) Inventor: Wayne R. Lumpkin, Littleton, CO (US)

(73) Assignee: Avid, LLC, Englewood, CO (US)

( * ) Notice: Subject to any disclaimer, the term of this patent is extended or adjusted under 35 U.S.C. 154(b) by 0 days.

(21) Appl. No.: 09/363,131

(22) Filed: Jul. 28, 1999

(51) Int. Cl.[7] .................................................. F16D 69/00
(52) U.S. Cl. ................................. 188/250 B; 188/24.11
(58) Field of Search .............................. 188/24.11, 24.12, 188/24.22, 250 B, 250 G, 251 R, 258

(56) References Cited

U.S. PATENT DOCUMENTS

| | | |
|---|---|---|
| 2,355,419 | 8/1944 | Bruce . |
| 3,860,094 | 1/1975 | Brenton . |
| 3,868,002 * | 2/1975 | Babled ................. 188/73.1 |
| 4,029,181 | 6/1977 | Lewis . |
| 4,036,333 | 7/1977 | Mathauser . |
| 4,055,235 * | 10/1977 | Tanaka et al. ............ 188/24.11 |
| 4,135,606 | 1/1979 | Lewis . |
| 4,230,208 | 10/1980 | Gale . |
| 4,315,563 | 2/1982 | Hayashi et al. . |
| 4,470,483 | 9/1984 | Holtz . |
| 4,775,036 * | 10/1988 | Harrison ................. 188/250 B |
| 4,805,742 | 2/1989 | Sato . |
| 5,064,027 | 11/1991 | Akamatsu . |
| 5,388,675 * | 2/1995 | Kahr et al. .............. 188/250 B |
| 5,555,959 | 9/1996 | Everett ................... 188/73.1 |
| 5,743,284 * | 4/1998 | Lumpkin ................. 188/24.22 |
| 5,896,955 * | 4/1999 | Everett ................... 188/24.12 |
| 6,105,735 * | 8/2000 | Lin et al. ................ 188/73.1 |
| 6,109,399 * | 8/2000 | Crawford et al. .......... 188/250 B |

FOREIGN PATENT DOCUMENTS

| | | |
|---|---|---|
| 818322 | 9/1937 | (FR) . |
| 1135068 | 4/1957 | (FR) . |
| 2148424 | 5/1985 | (GB) . |
| 2219365 | 12/1989 | (GB) . |
| 2180-320 | 7/1990 | (JP) . |

* cited by examiner

Primary Examiner—Robert J Oberleitner
Assistant Examiner—Pamela J. Rodriguez
(74) Attorney, Agent, or Firm—Swanson & Bratschun, L.L.C.

(57) ABSTRACT

A brake pad block for a bicycle wheel rim brake which includes an elongate holder and a plurality of pad segments having a contact surface for abutting a wheel rim, with at least two of the plurality of pad segments having distinct contact surfaces within a contact surface plane providing a different frictional characteristic when abutting the wheel rim. The pad segments are removeably and slideably engaged with the elongate holder in a direction parallel to the contact surface plane with the contact surfaces extending from the holder in an operative orientation for abutment with the wheel rim. A stay is operatively associated with the elongate holder and the pad segments to selectively maintain the slideably engaged pad segments in a fixed position relative to the pad holder and permits slideable disengagement of the pad segments from the pad holder.

17 Claims, 1 Drawing Sheet

BRAKE BLOCK FOR A BICYCLE HAVING REPLACEABLE BRAKE PAD SEGMENTS

TECHNICAL FIELD

The present invention is directed toward bicycle brakes and more particularly to a brake blocks for a bicycle having replaceable brake pad segments for varying the frictional characteristics for the brake block.

BACKGROUND ART

Caliper and cantilever brakes are commonly used on bicycles. Both of these types of brakes utilize brake blocks consisting of a brake pad and a brake pad mounting structure for attaching the brake blocks to caliper or cantilever brake arms in operative engagement on opposite sides of a bicycle wheel rim. Upon actuation, opposing cantilever or caliper brake arms move the contact surface of the brake block into abutment on opposing sides of the bicycle rim to stop rotation of the rim relative to the brake. The contact surface corresponds to a leading surface of a brake pad of the brake block. It is known that varying the composition of the material comprising the brake pad varies the frictional properties of the brake pad. It is also known to vary the texture or form of the leading surface of the brake pad to alter the frictional characteristics, somewhat similar to variations in the tread design of a tire.

It is known in the art that varying the frictional characteristics of the brake pad can optimize braking performance under differing circumstances. For example, under wet braking conditions it is generally preferable to use a brake pad of a soft elastomeric material which may be embedded with silicon dioxides or other friction abrasives to maximize the coefficient of friction. For dry braking, harder elastomers are generally preferred, and these harder elastomers are often impregnated with clay or graphite which lowers the coefficient of friction so as to provide for smoother stopping.

It has been recognized in the art that it can be desirable to combine brake pad segments having desired frictional characteristics to improve performance under both wet and dry conditions which can be encountered during a ride. For example, Everett, U.S. Pat. No. 5,555,959, teaches a brake pad assembly for a bicycle having first and second pad portions formed of different elastomeric compounds for imparting different frictional characteristics to a brake shoe pad, with the first and second portions being molded as a unitary brake pad member. However, the structure of Everett does not allow a user to interchange brake pad segments so as to optimize brake pad performance in accordance with the user's personal preferences or in accordance with the particular environment in which the user rides. For example, with the development of side pull cantilever brakes (commonly known as "V-brakes"), riders experience significantly greater mechanical advantage when applying their brakes than are experienced with conventional cantilever and caliper brakes. Because of this increased rim grabbing power, it would be desirable to provide riders with the option to customize a combination of brake pad segments to compensate for the increased rim gripping power, particularly as the rider's environment varies between wet and dry conditions. Unfortunately, Everett provides only manufacturer selected characteristics for the brake pad. Moreover, because the structure of Everett teaches integrally molded brake pad assemblies of different hardness, the respective segments will necessarily wear at different rates. If a user is not careful to replace the brake pad assembly as the softer brake pad segment wears, braking ability can be seriously impaired, creating a danger to the rider, particularly under wet riding conditions. Thus, the entire brake pad assembly must be replaced at significant cost even though the harder pad segments may be in excellent condition.

Other prior art teaches a brake pad consisting of hard and soft rubber for varying frictional characteristics. For example, French Patent No. 818,322, teaches a brake pad having a series of alternating soft rubber and hard rubber strips which are molded into a desired shape. French Patent No. 818,322, like Everett, does not provide the user with the ability to vary the frictional characteristics of the brake shoes by substituting brake pad segments.

Similarly, French Patent No. 1,135,068, teaches a brake pad having a soft rubber portion over two-thirds of the length of the pad with a leather portion over one-third of the pad. This patent teaches that the rubber portion deposits a film on the rim which enables the leather portion to not slip. As with Everett and French Patent No. 818,322, French Patent No. 1,135,068, does not teach any manner for the individual user to selectively vary the frictional characteristics of the pad by selectively changing the various pad segments.

The present invention is intended to overcome one or more of the problems discussed above.

SUMMARY OF THE INVENTION

One aspect of the present invention is a brake pad block for a bicycle wheel rim brake which includes an elongate holder. A plurality of pad segments each have a contact surface for abutting a wheel rim, with at least two of the plurality of pad segments having distinct contact surfaces providing a different frictional characteristic when abutting the wheel rim. The pad segments are removably and slidably engaged with the elongate holder with the contact surface extending from the holder substantially co-planer with each other in an operative orientation for abutment with the wheel rim. A stay operatively associated with the elongate holder and the pad segments selectively maintains the slidably engaged pad segments in a fixed position relative to the pad holder and permits slidable disengagement of the pad segments from the pad holder. Preferably, the pad segments engage the elongate holder for exclusively lengthwise slidable movement and the pad holder has a stop at one lengthwise end which prevents slidable movement of a first pad segment beyond the one lengthwise end of the holder. The stay is operatively associated with the other lengthwise end of the holder to selectively prevent slidable movement of a second pad segment relative to the holder. The stay may comprise a pin cooperatively and axially received in a hole in the holder and driven into the second pad segment. Preferably, each pad segment has a trailing surface opposite the leading surface and a side wall between the leading and trailing surfaces. The holder and the pad segments are removably and slidably engaged by a lengthwise engaging recess on the sidewall of each pad segment and a cooperating lengthwise rail on the holder.

Another aspect of the present invention is a method of selectively varying the frictional characteristics of a brake block for a bicycle wheel rim brake. The method includes providing an elongate holder and providing a plurality of pad segments having a contact surface for abutting a wheel rim, with at least two of the plurality of pad segments having distinct contact surfaces for providing different frictional characteristics when abutting a wheel rim. Select pad segments are slidably engaged with the elongate holder with the contact surfaces extending from the holder in an operative orientation for abutment with a wheel rim, the contact surfaces being substantially co-planer with each other and adjacent pad segments being in abutment. The pad segments are selectively maintained in a fixed position relative to the pad holder and selectively permitted to be slidably disengaged from the pad holder to replace pad segments and vary the frictional characteristics of the brake block.

The brake pad block for a bicycle having replaceable brake pad segments of the present invention allows a user to quickly and easily customize the brake pad assembly of the brake shoe to provide desired frictional characteristics. The exchangeable brake pad segments allow the user to quickly and easily customize the brake pads for varying conditions, such as between wet and dry conditions. In addition, the user can replace brake pad segments of a brake pad assembly that wear more quickly than other segments of the assembly. For example, softer segments, which typically wear much faster than harder segments, can be replaced as needed without the expense and waste of replacing the entire brake pad assembly. By varying the composition of elastomers from which the brake pad segments are made and by varying the configuration of the leading or engaging surface of the brake pads, virtually limitless combinations of brake shoes are available. Furthermore, segments can be provided in different colors that enable the user to customize a color scheme according to his or her preference.

DETAILED DESCRIPTION OF THE PREFERRED EMBODIMENT

Figure 1:
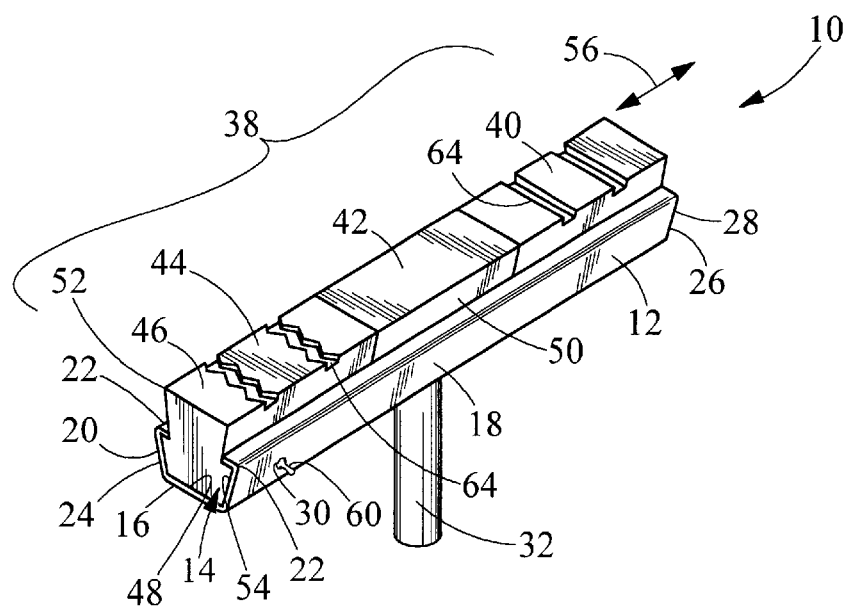
FIG. 1 is a perspective view of a brake block having selectively replaceable brake pad segments in accordance with the present invention.

A brake block having replaceable brake pad segments 10 in accordance with the present invention is illustrated in FIG. 1. The brake block consists of an elongate pad holder 12 formed of a rigid material, typically a metal such as aluminum, although some thermoplastics may also be suitable. The pad holder is preferably integrally formed from a single piece of material. The elongate pad holder 12 defines a trough 14 consisting of a bottom or backing portion 16 and a pair of sidewalls 18, 20. Each sidewall includes a lengthwise rail 22 at its distal end. As illustrated in FIG. 1, the rail 22 is defined by a flange. Alternatively, the rail could be defined by the sidewalls 18, 20 being inclined toward one another. The first end 24 of the trough 14 is unobstructed. The second end 26 of the trough 14 is obstructed by an end wall or stop 28. A hole 30 is provided in the sidewall 18 proximate the first end 24. A post 32 extends from the back of the backing portion 16 and provides a structure for attaching the brake block to a brake arm of a cantilever or caliper brake for operative engagement with a bicycle wheel rim in a manner well known in the art.

A brake pad assembly 38 consists of a first brake pad segment 40, a second brake pad segment 42 and a third brake pad segment 44. The invention contemplates at least two segments with an unlimited maximum number of segments. The first, second and third brake pad segments each consist of a leading or contact surface 46, a trailing surface 48 and a pair of sidewalls 50, 52 extending therebetween. Each sidewall 50, 52 defines a shoulder 54 which matingly engages the rails 22 of the sidewalls 18, 20 to prevent relative movement of the brake pad segments relative to the elongate pad holder 12 except in the direction of the operative axis illustrated by the arrow 56.

The brake block is assembled by serially slidably engaging the first, second and third brake pad segments 40, 42, 44 in the open first end 24 of the trough 14 of the elongate pad holder 12. The segments are inserted in abutment with one another with the first segment 40 abutting the end wall 28 of the second end 26 of the trough 14. With the brake pad segments fully inserted within the trough and in abutment with one another, a stay, in the form of a pin 60 cooperating with the stop 28 prevents movement of the pad segments. Alternatively, the stay may be each brake pad segment having a hole or channel with a pin securing the pad as discussed with respect to the third pad segment. The pin 60 is inserted through the hole 30 and either into a corresponding hole 61 or channel 62 (see FIG. 2) in the third brake pad segment 44 or simply driven into the elastomeric material of the third brake pad segment 44. The first, second and third brake pad segments 40, 42, 44 can be made of a variety of elastomeric material and include imbedded compounds to improve frictional characteristics such as silcon dioxides or other abrasives, or embedded compounds to decrease frictional characteristics, such as clay or graphite. Different combinations of pad segments can be selected to optimize frictional characteristics to provide desirable braking for varying conditions. For example, particular elastomers can be selected to stop squealing and grabbing, while giving the pad stopping power at the same time. Alternatively, different combinations can be used in wet or dry conditions, for cross-country versus downhill racing or the like. Furthermore, different brake pad segment combinations could be used on opposing pairs of brake blocks to further fine tune braking characteristics.

In addition to being made of varying elastomeric compounds, the contact surface 46 can have varying textures. For example, the second brake 42 pad segment illustrated in FIG. 1 has a smooth leading surface. The third brake pad segment 44 has shark tooth treads 64. The first brake pad segment 40 simply has straight treads 64. Thus, it should be readily apparent that by varying elastomers, embedded particles within the elastomers and contact surface tread design, a virtually unlimited combination of brake pad segments can be available to the user. Because the brake block allows a user to slidably disengage the various brake blocks simply by removal of the pin 60 and axially sliding the segments out the open end of the trough 14, the users can provide these customized characteristics with little effort. Further, the brake block having replaceable brake pad segments 10 provides the advantage that individual pad segments can be replaced. For example, if the third brake pad segment 44 is made of a soft elastomeric material to enhance braking under wet conditions while the first brake pad segment 40 is made of a hard elastomeric material to optimize braking under dry conditions, the third brake pad segment 44 will invariably wear much quicker than the first brake pad segment 40. This invention allows the user to quickly and easily replace the brake pad segment 44 without having to dispose of the entire brake pad assembly. This not only decreases the cost to the user, it also promotes safety by encouraging replacement of worn parts of a brake pad assembly. A further advantage of the present invention is brake pad segments can be made of different colors, allowing a rider to customize the color combination. This not only provides an avenue of personal expression, it provides a way to quickly identify one's bike.

Figure 2:
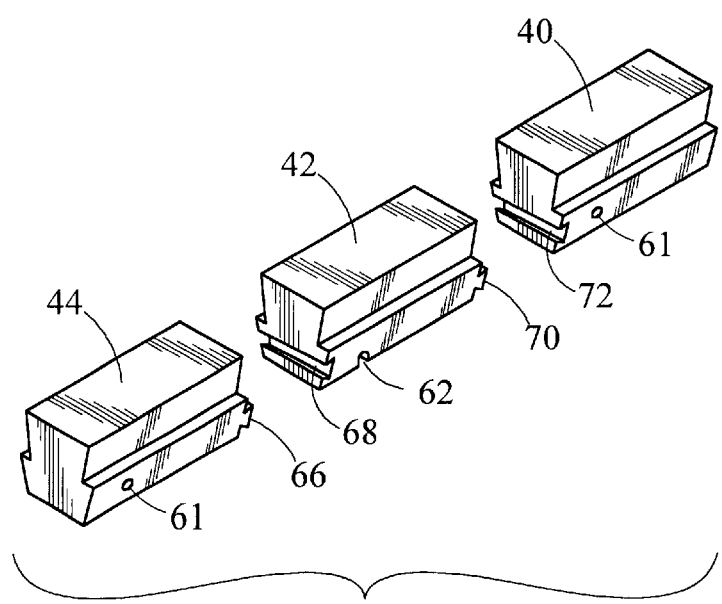
FIG. 2 is a perspective exploded view of the brake pad segments in accordance with the present invention.

FIG. 2 shows the first, second and third brake pad segments 40, 42 and 44 apart from the holder 12. FIG. 2 includes a modified embodiment wherein the third brake pad segment 44 includes a keyed flange 66 transverse its width that slidably mates with a corresponding keyed slot 68 in the second brake pad segment 42. The brake pad segment 42 further includes a keyed flange 70 that slidably mates with the keyed slot 72 in the first brake pad segment 40. This structure has the advantage of further helping secure the first, second and third pad segments together when they are deployed in the elongate pad holder 12. In use, the respective keyed flanges and slots would be slidably engaged and then the first, second and third pad segments 40,42 and 44 would be slid into the pad holder 12 in the manner discussed above. As illustrated in FIG. 2, the transverse keyed grooves and slots are located in proximity to the trailing surface 48 so as to reside within the sidewalls 18,20 of the pad holder 12 when assembled.

What is claimed is:

1. A brake block for a bicycle comprising:

first and second separate and distinct brake pad segments, each segment having a rim engaging leading surface extending lengthwise along an operative axis, a trailing surface and a pair of side walls between the leading and trailing surfaces, at least one of the side walls having a lengthwise engagement groove between the leading and the trailing surfaces substantially parallel to the operative axis;

an elongate pad holder, the pad holder axially receiving the trailing surface of each pad segment and including an engagement rail slideably engaging each engagement groove of each pad segment, the pad holder being configured to prevent movement of a pad segment received therein except along the operative axis; and a stay, the stay selectively maintaining the slideably engaged pad segments in a fixed axial position relative to the pad holder and permitting axial slideable disengagement of pad segments from the pad holder.

2. The brake pad block of claim 1 wherein the first and second pad segments are formed of a different elastomeric compound to define distinct contact surfaces.

3. The brake pad block of claim 1 wherein the first and second pad segments have contact surfaces of distinct textures to define distinct contact surfaces.

4. The brake pad block of claim 1 wherein the stay of the pad block comprises:

a stop at one lengthwise end of the holder, the stop preventing slidable movement of the first pad segment beyond the one lengthwise end of the holder; and a pin operatively associated with the other lengthwise end of the holder, the pin preventing slidable movement of the second pad segment relative to the holder.

5. The brake pad block of claim 4 further comprising at least one other pad segment between the first and second pad segments.

6. The brake pad block of claim 4 wherein the pin is cooperatively and axially received in a hole in the holder and engaged with the second pad segment.

7. The brake pad block of claim 1 wherein the first pad segment and the second pad segment matingly engage with one another.

8. The brake pad block of claim 7 wherein the first pad segment further includes a transverse keyed flange and the second pad segment includes a mating transverse keyed slot, the keyed flange and the keyed slot being matingly engaged.

9. A brake pad block for a bicycle wheel rim brake comprising:

an elongate pad holder;

a plurality of separate and distinct pad segments each having a contact surface which is coplanar within a contact surface plane for abutting a wheel rim, with at least two of the plurality of pad segments having distinct contact surfaces providing a different frictional characteristic when abutting a wheel rim, the pad segments removeably and slideably engaging the elongate holder along an axis parallel to the contact surface plane with the contact surface of each of the plurality of pad segments extending from the holder in an operative orientation for abutment with a wheel rim; and a stay, the stay selectively maintaining the slideably engaged pad segments in a fixed position relative to the elongate pad holder and permitting slideable disengagement of pad segments from the elongate pad holder.

10. The brake pad block of claim 9 wherein at least two of the pad segments are formed of a different elastomeric compound to define the distinct contact surfaces.

11. The brake pad block of claim 9 wherein at least two of the pad segments have contact surfaces of distinct textures to define the distinct contact surfaces.

12. The brake pad block of claim 9 wherein the pad segments engage the elongate holder for exclusively lengthwise slidable movement and the stay of the pad block comprises:

a stop at one lengthwise end of the holder, the stop preventing slidable movement of a first pad segment beyond the one lengthwise end of the holder; and a pin operatively associated with the other lengthwise end of the holder, the pin preventing slidable movement of a second pad segment relative to the holder.

13. The brake pad block of claim 12 further comprising at least one other pad segment between the first and second pad segments.

14. The pad block of claim 12 wherein the pin is cooperatively and axially received in a hole in the holder and engaged with the second pad segment.

15. The pad block of claim 9 wherein each pad segment has a trailing surface opposite the leading surface and a sidewall between the leading and the trailing surfaces and the holder and the pad segments are removably and slidably engaged by a lengthwise engaging recess on the side wall of each pad segment and a cooperating lengthwise rail on the holder.

16. The pad block of claim 9 wherein a first pad segment further includes a transverse keyed flange and a second pad segment includes a mating transverse keyed slot, the keyed flange and the keyed slot being matingly engaged.

17. A method of selectively varying the frictional characteristics of a brake block for a bicycle wheel rim brake comprising:

providing an elongate holder;

providing a plurality of separate and distinct pad segments each having a contact surface which is coplanar within a contact surface plane for abutting a wheel rim, with at least two of the plurality of pad segments having distinct contact surfaces providing a different frictional characteristic when abutting a wheel rim;

slideably engaging select pad segments with the elongate holder in a direction parallel to the contact surface plane with the contact surfaces of each of the plurality of pad segments extending from the holder in an operative orientation for abutment with a wheel rim, adjacent pad segments being in abutment; and selectively maintaining the slideably engaged pad segments in a fixed position relative to the elongate holder and permitting slideable disengagement of pad segments from the elongate holder to allow a user to replace pad segments and vary the frictional characteristics of the brake block.

\* \* \* \* \*